(12) United States Patent
Schneider

(10) Patent No.: US 8,973,604 B2
(45) Date of Patent: Mar. 10, 2015

(54) DEVICE FOR PRODUCING AND PROVIDING A VACUUM, AND VENTILATION VALVE

(75) Inventor: Willi Schneider, Bodelshausen (DE)

(73) Assignee: Joma-Polytec GmbH, Bodelshausen (DE)

( * ) Notice: Subject to any disclaimer, the term of this patent is extended or adjusted under 35 U.S.C. 154(b) by 1039 days.

(21) Appl. No.: 12/999,215

(22) PCT Filed: Jun. 29, 2009

(86) PCT No.: PCT/EP2009/058105
§ 371 (c)(1),
(2), (4) Date: Dec. 15, 2010

(87) PCT Pub. No.: WO2010/000694
PCT Pub. Date: Jan. 7, 2010

(65) Prior Publication Data
US 2011/0126922 A1 Jun. 2, 2011

(30) Foreign Application Priority Data
Jul. 1, 2008 (DE) .......................... 10 2008 032 242

(51) Int. Cl.
*F16K 17/06* (2006.01)
*B60T 17/02* (2006.01)
*B60T 13/52* (2006.01)

(52) U.S. Cl.
CPC *B60T 17/02* (2013.01); *B60T 13/52* (2013.01)
USPC .................... 137/522; 137/512.3; 137/614.11

(58) Field of Classification Search
CPC ........ F16K 15/18; F16K 17/06; F16K 17/065
USPC ................. 137/486, 512, 512.3, 526, 614.11, 137/625.66, 522; 251/25
See application file for complete search history.

(56) References Cited

U.S. PATENT DOCUMENTS 3,003,823 A * 10/1961 Williams ......................... 303/12
3,285,672 A * 11/1966 Avrea ................................ 303/9
5,918,853 A * 7/1999 Yamabe et al. ............... 251/61.5

FOREIGN PATENT DOCUMENTS

| DE | 102006004288 | 8/2007 |
| EP | 0 759 865 B1 | 3/1997 |
| GB | 954 316 A | 4/1964 |
| GB | 2 022 036 A | 12/1979 |

* cited by examiner

*Primary Examiner* — Kevin Lee
*Assistant Examiner* — P. Macade Nichols
(74) *Attorney, Agent, or Firm* — Henry M.Feiereisen LLC

(57) ABSTRACT

The invention relates to a device for producing and providing a vacuum for a vacuum consumer, having a vacuum source, having a suction valve, having a non-return valve arranged between the vacuum consumer and the suction valve, and having a ventilation valve, the control inlet of which ventilation valve is connected to the suction port of the vacuum source, the output of which ventilation valve opens out between the control valve and the non-return valve, and the input of which ventilation valve is open to the environment.

24 Claims, 2 Drawing Sheets

US 8,973,604 B2

DEVICE FOR PRODUCING AND PROVIDING A VACUUM, AND VENTILATION VALVE

CROSS-REFERENCES TO RELATED APPLICATIONS

This application is the U.S. National Stage of International Application No. PCT/EP2009/058105, filed Jun. 29, 2009, which designated the United States and has been published as International Publication No. WO 2010/000694 and which claims the priority of German Patent Application, Serial No. 10 2008 032 242.3, filed Jul. 1, 2008, pursuant to 35 U.S.C. 119(a)-(d).

BACKGROUND OF THE INVENTION

The invention relates to an apparatus for producing and providing a vacuum for a vacuum consumer. The invention also relates to a ventilation valve.

Devices of this type for producing and providing a vacuum are used, for example, in vehicles for operating a brake booster. One problem is that when the vehicle is stationary and the engine is switched off, the vacuum in the brake booster slowly decreases due to leakage, in particular in the vacuum generator and up to the suction valve, approaching atmospheric pressure. As a result, the brake pedal cannot be moved when attempting to start the vehicle and hence the trigger point required for starting cannot be attained in vehicles with automatic transmissions, so that the vehicle cannot be started. Responsible is here the check valve upstream of the brake booster which, unlike the suction valve, does not have a return spring.

It is therefore an object of the invention to provide an apparatus and/or a ventilation valve which reduces the risk that the brake booster is slowly vented.

SUMMARY OF THE INVENTION

This object is solved with an apparatus for producing and providing a vacuum for a vacuum consumer, with a vacuum source, a suction valve, a check valve arranged between the vacuum consumer and the suction valve, and a ventilation valve having a control input connected to the suction port of the vacuum source and an output terminating between the suction valve and check valve and an input which is open to atmosphere.

The apparatus of the invention has the significant advantage that with the ventilation valve the line segment between the suction valve and the check valve, which is located immediately before the vacuum consumer, i.e., the brake booster, is vented, so that the check valve assumes its closed position, if it has a neutral equilibrium position. The check valve does not have a return or closure spring, because a closure spring which always holds the check valve in a defined closed position, would significantly limit the pumping efficiency of the vacuum source, i.e., the vacuum pump. For this reason, the check valve, unlike the suction valve, does not have a closure spring or return spring. The check valve can always assume a neutral equilibrium position when the pressure is identical before and after the check valve.

However, if the region between the suction valve and the check valve is vented, then the check valve always assumes its closed position, because it is pressed into its closed position by the pressure difference before and after the closure member, thereby maintaining the vacuum in the brake booster. The vehicle can then be started without any problem even after a long stoppage or in the event of leakage in the supply lines; in particular, in vehicles with automatic transmission, the brake pedal always reaches the release point required for starting.

According to another embodiment of the invention, the ventilation valve has a housing with three pressure chambers wherein the control input terminates in the first pressure chamber; the second pressure chamber is according to the invention connected via an input or an opening to atmosphere, wherein the output of the ventilation valve exits from the third pressure chamber. According to the invention, the first pressure chamber includes a wall constructed in sections formed by an elastic membrane. This elastic membrane is deformed responsive to the pressure in the first pressure chamber and operates as a drive for a tappet. Depending on the pressure in the first pressure chamber, the tappet assumes a position corresponding to the pressure, starting from a threshold value.

According to another embodiment, the tappet has a valve element separating the second from the third pressure chamber. In other words, the second pressure chamber can be connected with the third pressure chamber with the tappet by moving the valve element with the tappet. Opening or closing this valve therefore depends on the pressure in the first pressure chamber.

To obtain an unambiguous valve position and to produce a defined opening pressure (threshold value), the valve element is a biased in the direction of the valve seat, in particular with a spring. The bias force can preferably be adjustable, with the bias force operating against the pressure in the first pressure chamber.

To reduce the manufacturing cost of the ventilation valve, the housing is constructed of two, in particular identical, barrel-shaped housing parts, which have openings facing each other and being flanged to each other. The housing can then be relatively easily provisioned and subsequently mounted.

The aforementioned object is also solved with a ventilation valve having the aforementioned properties and features.

Additional advantages, characteristic features and details of the invention are recited in the dependent claims and in the following description, where a particularly preferred exemplary embodiment is described in more detail with reference to the drawing. The features illustrated in the drawing and described in the description of the claims can be important for the invention either individually or in any combination.

DETAILED DESCRIPTION OF PREFERRED EMBODIMENTS

Figure 1:
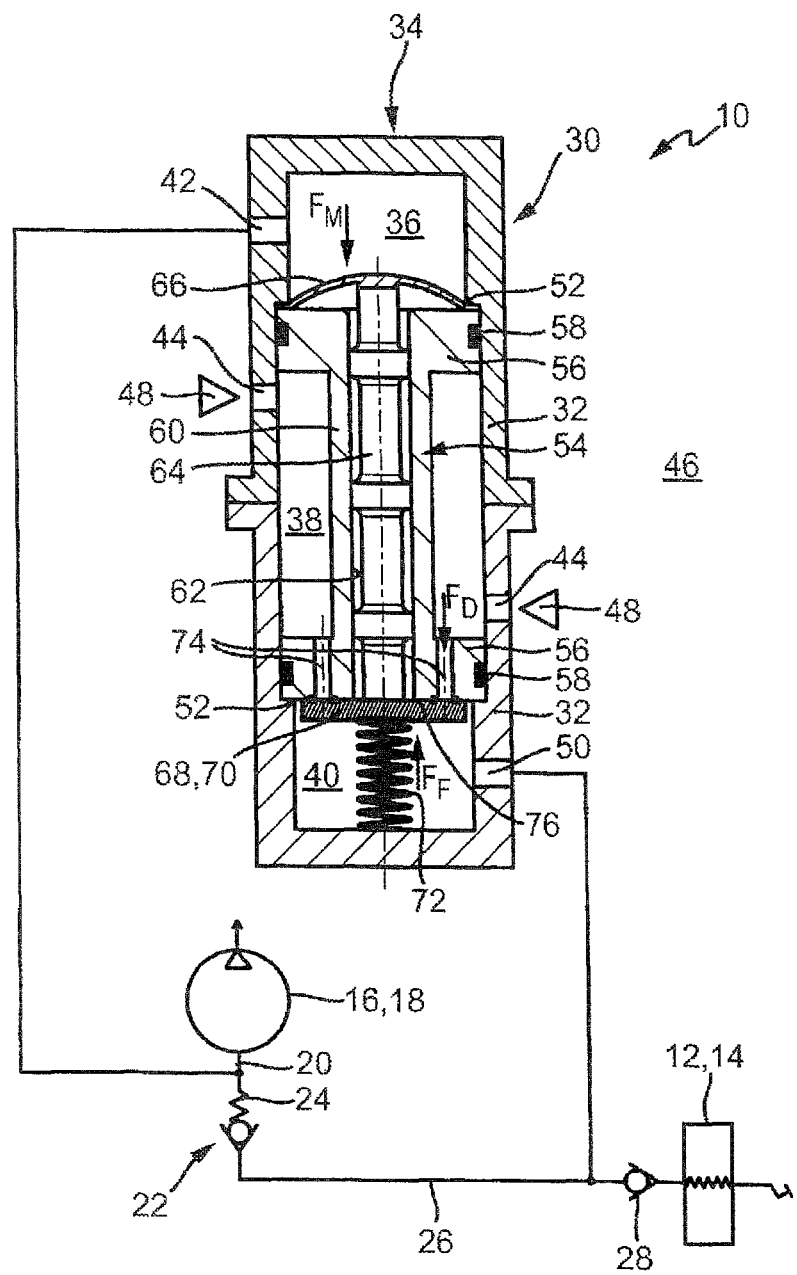
FIG. 1 the apparatus according to the invention with a closed ventilation valve in a longitudinal sectional view.

FIG. 1 shows an apparatus having the overall reference symbol 10 capable of producing and providing a vacuum for a vacuum consumer 12, for example a brake booster 14 for a vehicle. A vacuum source 16, for example a vacuum pump 18, is provided which has a suction port 20 equipped with a suction valve 22. The suction valve 22 is held in a defined closed position by a closure spring 24 or return spring. The suction valve 22 is connected via a line 26 with a check valve 28, wherein the check valve 28 is constructed without a closure spring. The check valve 28 is then connected to the vacuum consumer 12, i.e., the brake booster 14.

FIG. 1 also shows a ventilation valve 30 which has a housing 34 constructed of two identical housing parts 32. A first pressure chamber 36, a second pressure chamber 38 and a third pressure chamber 40 are formed in the housing 34. The first pressure chamber 36 has a control input 42 which is connected to the suction port 20 or the vacuum source 16 itself. The second pressure chamber 48 has two inputs configured as openings 44 which connect the pressure chamber 48 to atmosphere 46, so that air can flow in the direction of the arrow 48. The third pressure chamber 40 has an output which is connected to the line 26.

The two housing parts 32 have a shoulder 52 disposed at a transition from the second pressure chamber 38 to the first pressure chamber 36 as well as from the second pressure chamber 38 to the third pressure chamber 40, allowing an inner housing 54 to be clamped between the two shoulders 52. This inner housing 54 has two plates 56 at the respective ends, with each plate sealingly received by the two housing parts 32 with a seal 58, for example an O-ring, and with the two plates 56 being connected with each other by way of a sleeve 60.

The inner housing 54 is formed as a single piece and has a central bore 62 in which a tappet 68 is supported for movement in the direction of the longitudinal axis of the ventilation valve 30. The upper end of the tappet 64 contacts a membrane 66 which forms one wall of the first pressure chamber 36 and which is clamped at its edge between the shoulder 52 and one of the plates 56 of the inner housing 54. The lower part of the tappet 64 is equipped with a valve element 68, it in particular a sealing disk 70, which is oriented parallel on the lower plate 56 of the inner housing 54, with the tappet 64 being biased in the direction of the plate 56 by way of a coil spring 72. The valve element 68 seals through openings 74 which extend through the lower plate 56 and connect the second pressure chamber 38 with the third pressure chamber 40.

Figure 2:
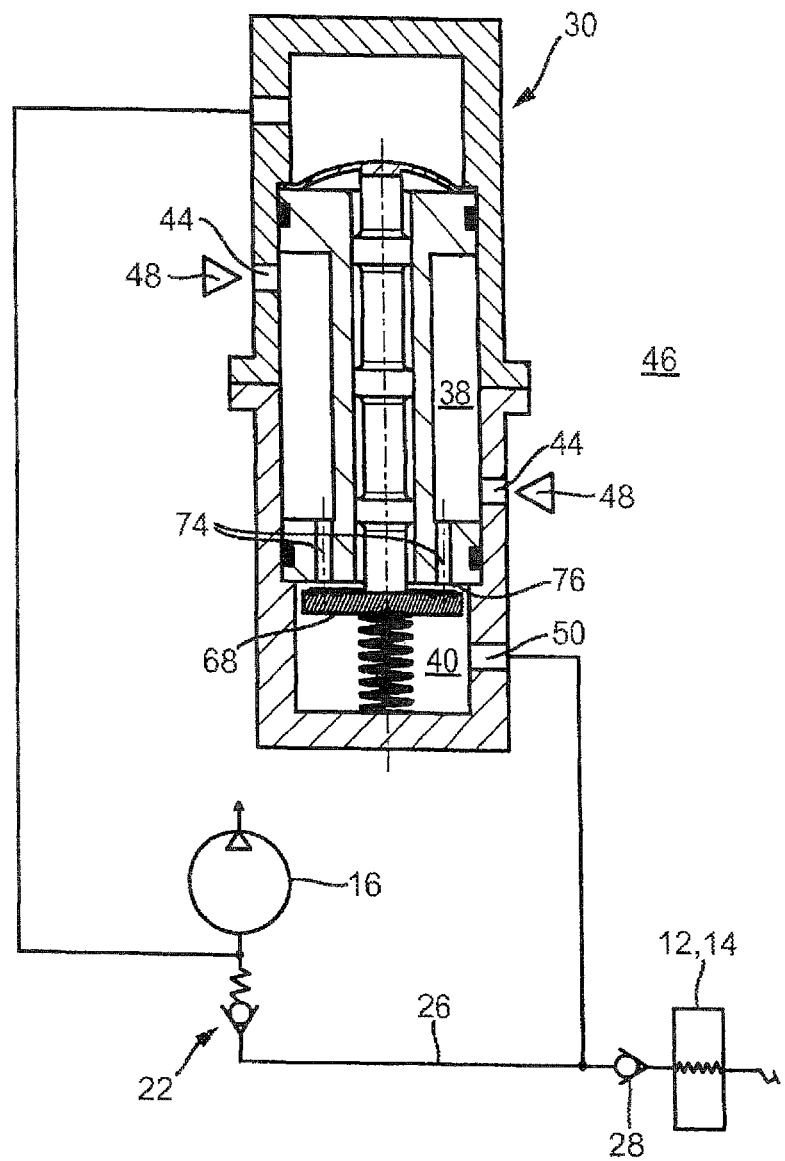
FIG. 2 the apparatus according to FIG. 1 with the ventilation valve in the open position.

FIG. 1 shows the closed position of the valve element 68, wherein the valve element 68 contacts a plate 56 forming a valve seat 76. In FIG. 2, the valve element 68 is lifted from the valve seat 76.

The functionality of the apparatus 10 will now be described. The vacuum source 18 produces a vacuum which is supplied via connecting lines not only to the vacuum consumer 12, but also to the first pressure chamber 36 and the third pressure chamber 40. When the vacuum source 16 is switched off, for example when the motor of a vehicle is stopped, then the suction valve 22 is closed by the closure spring 24, whereas the check valve 28 can assume a neutral equilibrium position, because the closure member is not urged into the closed position by a closure spring and the pressure difference before and after the check valve 28 is too small to produce an air flow capable of urging the valve member of the check valve 28 into the closed position.

Leaks in the vacuum source or also in the line to the check valve 28 may reduce the original vacuum therein of about 80 mbar (absolute) slowly towards the ambient pressure (1024 mbar). Because the suction port 20 is connected with a control input 42 of the ventilation valve 30, the vacuum in the first pressure chamber 36 decreases accordingly. This increase in the absolute pressure operates on the membrane 66, thereby exerting a force $F_M$ on the tappet 64 in the direction of the valve element 68. However, the closure force $F_F$ of a spring 72 minus the force $F_D$ of the atmospheric pressure, which operates on the valve element 68 via the through openings 74, operates against this force $F_M$. If the sum of the forces $F_M$ and $F_D$ is greater than the closure force $F_F$, then the valve element 68 is lifted from the valve seat 76 which, as mentioned above, is illustrated in FIG. 2. The through openings 74 are now open and the third pressure chamber 40 is (briefly) connected with the second pressure chamber 38 and hence via the openings 44 to atmosphere 46, allowing air to flow into the third pressure chamber 40 in the direction of the arrows 48. The line 26 is vented via the output 50, with the temporary airflow cause by the pressure difference before and after the check valve 28 urging the check valve 28 into its defined closed position, so that the vacuum in the vacuum consumer 12 can be maintained. The check valve 28 assumes its closed position in any case, because the pressure difference before and after the check valve 28 is large enough to urge its closure member securely against its valve seat. The air flowing into the line 26 is oil-free and can also be delivered through a filter, making it also dust-free.

With the apparatus 10 according to the invention and particularly with the ventilation valve 30 according to the invention, a vacuum is always reliably supplied to the vacuum consumer 12, in particular the brake booster 14, even if the vacuum source 16 is not operating.

The invention claimed is:

1. An apparatus for producing and providing a vacuum, comprising
   a brake booster,
   a vacuum source having a suction port,
   a suction valve,
   a line connecting the suction valve with the brake booster, and
   a check valve connected serially in the line between the brake booster and the suction valve, and
   a ventilation valve comprising a housing with three pressure chambers, a control input connected directly to the suction port of the vacuum source and terminating in a first of the three pressure chambers, a second of the three pressure chambers being connected to an input which is open to atmosphere, and an output terminating in a third of the three pressure chambers and being connected directly with the line between the suction valve and the check valve.

2. The apparatus of claim 1, wherein the first pressure chamber comprises a wall constructed in sections and formed of an elastic membrane.

3. The apparatus of claim 2, wherein the membrane is constructed to operate as a drive for a tappet.

4. The apparatus of claim 3, wherein the tappet comprises a valve element separating the second pressure chamber from the third pressure chamber.

5. The apparatus of claim 4, wherein the valve element comprises a valve seat disposed between the second pressure chamber and the third pressure chamber.

6. The apparatus of claim 4, wherein the valve element is biased by a bias force in the direction of the valve seat.

7. The apparatus of claim 6, wherein the bias force is produced by a spring.

8. The apparatus of claim 6, wherein the bias force operates against pressure in the first pressure chamber.

9. The apparatus of claim 1, wherein the housing is constructed of two barrel-shaped housing parts.

10. The apparatus of claim 9, wherein the two barrel-shaped housing parts are identical.

11. The apparatus of claim 9, wherein the two barrel-shaped housing parts are flanged to each other, with openings facing each other.

12. The apparatus of claim 1, wherein the second pressure chamber of the ventilation valve is arranged in the housing between the first pressure chamber and the third pressure chamber.

13. A ventilation valve comprising:
a housing having a first, a second and a third pressure chamber,
a control input connected directly to a suction port of a vacuum source and terminating in the first pressure chamber,
an output terminating in the third pressure chamber and being connected directly with a line connected between a suction valve and a check valve, said suction valve and said check valve being connected in series between the brake booster and the vacuum source, and
an input connected to the second pressure chamber and open to atmosphere.

14. The ventilation valve of claim 13, wherein the first pressure chamber comprises a wall constructed in sections and formed of an elastic membrane.

15. The ventilation valve of claim 14, wherein the membrane is constructed to operate as a drive for a tappet.

16. The ventilation valve of claim 15, wherein the tappet comprises a valve element separating the second pressure chamber from the third pressure chamber.

17. The ventilation valve of claim 16, wherein the valve element comprises a valve seat disposed between the second pressure chamber and the third pressure chamber.

18. The ventilation valve of claim 16, wherein the valve element is biased by a bias force in the direction of a valve seat.

19. The ventilation valve of claim 18, wherein the bias force is produced by a spring.

20. The ventilation valve of claim 18, wherein the bias force operates against pressure in the first pressure chamber.

21. The ventilation valve of claim 13, wherein the housing is constructed of two barrel-shaped housing parts.

22. The ventilation valve of claim 21, wherein the two barrel-shaped housing parts are identical.

23. The ventilation valve of claim 21, wherein the two barrel-shaped housing parts are flanged to each other, with openings facing each other.

24. The ventilation valve of claim 13, wherein the second pressure chamber is arranged in the housing between the first pressure chamber and the third pressure chamber.

\* \* \* \* \*